United States Patent
O'Callaghan

(10) Patent No.: US 8,433,197 B2
(45) Date of Patent: Apr. 30, 2013

(54) METHODS AND SYSTEMS FOR IMPLEMENTING A UNIVERSAL SET TOP BOX

(75) Inventor: Daniel J. O'Callaghan, Fairfax Station, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

(21) Appl. No.: 13/179,233

(22) Filed: Jul. 8, 2011

(65) Prior Publication Data

US 2011/0268448 A1 Nov. 3, 2011

Related U.S. Application Data

(63) Continuation of application No. 11/896,417, filed on Aug. 31, 2007, now Pat. No. 7,978,979.

(51) Int. Cl.
*H04B 10/00* (2006.01)
(52) U.S. Cl.
USPC .......................................... 398/110; 398/106
(58) Field of Classification Search ............. 398/44, 398/82, 141, 142, 143, 139, 106, 110; 385/39
See application file for complete search history.

(56) References Cited

U.S. PATENT DOCUMENTS

| | | | |
|---|---|---|---|
| 5,880,864 A * | 3/1999 | Williams et al. | 398/71 |
| 6,984,077 B2 * | 1/2006 | Bush et al. | 385/97 |
| 7,010,265 B2 | 3/2006 | Coffin, III | |
| 7,079,733 B2 * | 7/2006 | Toriumi et al. | 385/101 |
| 7,360,078 B1 | 4/2008 | Lebouill | |
| 2003/0070174 A1 | 4/2003 | Solomon | |
| 2007/0003288 A1 * | 1/2007 | Tong et al. | 398/142 |

* cited by examiner

*Primary Examiner* — Dalzid Singh

(57) ABSTRACT

A system is disclosed. The system has a first receiver, a second receiver, and an input device configured to transmit a command signal in response to user input. The system also has an input waveguide having a first end in communication with the input device and terminating at the first receiver, and a second end in communication with the second receiver. The input waveguide is arranged to receive and route the command signal to the second receiver. The system also has an output waveguide having a first end in communication with the first receiver, and a second end in communication with the second receive. The second receiver is configured to determine whether the command signal is directed to the first receiver and/or the second receiver based a code contained in the command signal. The second receiver is further configured to execute the command signal when it is determined that the command signal is directed to the second receiver, and relay the command signal through the output waveguide to the first receiver for execution when it is determined that the command signal is directed to the first receiver.

6 Claims, 4 Drawing Sheets

METHODS AND SYSTEMS FOR IMPLEMENTING A UNIVERSAL SET TOP BOX

CROSS REFERENCE TO RELATED APPLICATION

This application is a continuation of Application No. 11/896,417, filed Aug. 31, 2007 (allowed) now U.S. Pat. No. 7,978,979, which is incorporated herein by reference in its entirety.

I. BACKGROUND INFORMATION

When customers purchase television services from a provider, they are usually supplied with standard equipment, including a set top box (STB) and a universal remote control to access content, such as television programs. The set top box includes, among other things, security and decoding functions which convert incoming content to a format compatible with the customer's television. Therefore, the set top box is required to access the service provider's programming. The set top box also usually controls content navigation and storage operations, such as, for example, channel selection, content guide viewing, network interactivity capabilities (e.g., pay-per-view and video on demand requests), and recording and/or playback features. As such, customers may rely solely on the set top box for many of the features, rendering redundant the same or similar functionality included in their own equipment. As a result, customers must oftentimes set aside the remote control(s) that came with their television and/or other home electronics equipment and instead use the universal remote supplied by the service provider.

One problem with this arrangement is that the universal remote control supplied by the service provider may not exploit all of the features available on the original remote control supplied with the customer's television. For instance, a customer's television may include features such as menus to adjust video settings (e.g., color, contrast, tint, brightness, etc.) and/or audio settings (e.g., bass, mid, treble, surround sound, etc.), volume control, picture-in-picture modes, auxiliary input selection, etc. These features may be utilized by inputting appropriate commands to feature-specific controls included on original remote control. However, the universal remote control may not provide controls specific to the unique features available on the customer's television. In many cases, the universal remote control only includes controls for features specific to the set top box and/or other generic features.

This has been a source of frustration for customers, because use of the service providers' required equipment in the context renders useless many of the features unique to the customers' equipment. This has also aggravated companies attempting to differentiate their products in the consumer electronics industry, because usable product functionality is ultimately limited by the equipment supplied by the service provider.

As such, there is a need to allow customers to use the original remote control, instead of the universal remote control supplied by the service provider, to control functions of both the television and the set top box.

II. BRIEF DESCRIPTION OF THE DRAWINGS

III. DETAILED DESCRIPTION OF PREFERRED EMBODIMENTS

Figure 1:
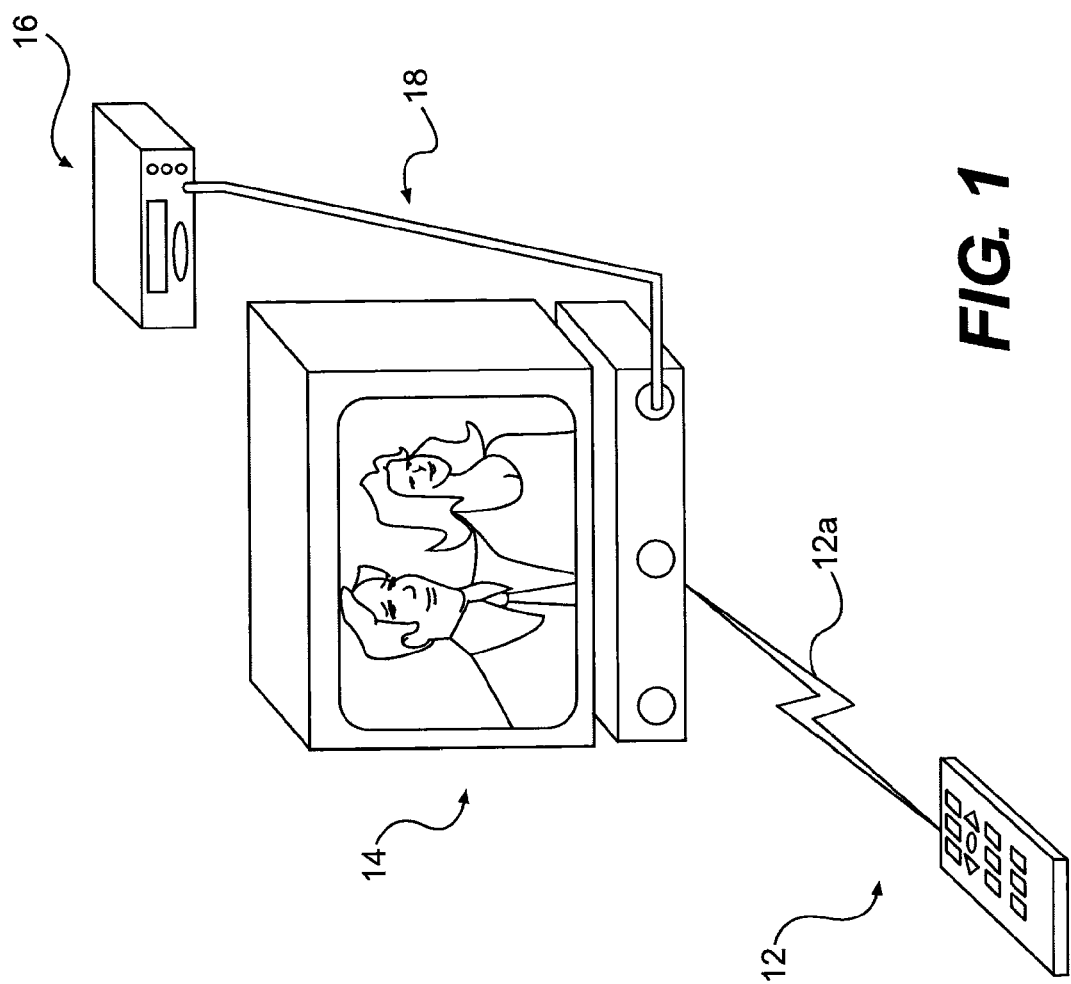
FIG. 1 is a pictorial representation of an exemplary disclosed system.

Reference will now be made in detail to an exemplary disclosed system, examples of which are illustrated in the accompanying drawings. The following description refers to the accompanying drawings in which the same numbers in different drawings represent similar elements unless otherwise represented. The implementations set forth in the following disclosure do not represent all possible implementations consistent with the disclosure. Instead, they are merely examples of systems and methods consistent with aspects related to the disclosure as recited in the appended claims.

One aspect of the disclosure is directed to a system. The system may include a first receiver, a second receiver, and an input device configured to transmit a command signal in response to user input. The system may also include an input waveguide having a first end in communication with the input device and terminating at the first receiver, and a second end in communication with the second receiver. The input waveguide may be arranged to receive and route the command signal to the second receiver. The system may further include an output waveguide having a first end in communication with the first receiver, and a second end in communication with the second receiver. The second receiver may be configured determine whether the command signal is directed to the first receiver and/or the second receiver based a code contained in the command signal. The second receiver may be further configured to execute the command signal when it is determined that the command signal is directed to the second receiver, and relay the command signal through the output waveguide to the first receiver for execution when it is determined that the command signal is directed to the first receiver.

Another aspect of the disclosure is directed to a method. The method may include transmitting a command signal from an input device in response to user input, receiving the command signal with an input waveguide, and routing the command signal to a first receiver through the input waveguide. The method may further include determining, by the first receiver, whether the command signal is directed to the first receiver and/or a second receiver based on a code contained in the command signal. The method may also include executing the command signal, by the first receiver, when it is determined that the command signal is directed to the first receiver; and relaying the command signal, by the first receiver, through an output waveguide to a second receiver for execution, when it is determined that the command signal is directed to the second receiver.

Another aspect of the disclosure is directed to a tether for coupling a first receiver and a second receiver. The tether may include an input waveguide and an output waveguide disposed parallel to one another with respect to longitudinal axes thereof, a first reflective cladding surrounding the input waveguide, and a second reflective cladding surrounding the output waveguide. The tether may also include an opaque insulator disposed between the input waveguide and the output waveguide, and a sheathing surrounding the input waveguide, the output waveguide, the first reflective coating, the second reflective coating, and the opaque insulator. Further, at least a portion of the input waveguide and a portion of the output waveguide may be exposed at a first end of the tether, and the exposed portion of the input waveguide may be in communication with an input device configured to transmit a command signal in response to user input.

Yet another aspect of the disclosure is directed to a system. The system may include an input device configured to transmit a command signal in response to user input, and a first receiver in communication with a second receiver. The first receiver may be configured to receive the command signal, determine whether the command signal is directed to the first receiver and/or the second receiver based on a code contained in the command signal. The first receiver may be further configured to execute the command signal when it is determined that the command signal is directed to the first receiver, and relay the command signal to the second receiver for execution when it is determined that the command signal is directed to the second receiver.

Still yet another aspect of the disclosure is directed to a method. The method may include transmitting a command signal from an input device in response to user input, receiving the command signal by a first receiver, and determining, by the first receiver, whether the command signal is directed to the first receiver and/or a second receiver based on a code contained in the command signal. The method may further include executing the command signal, by the first receiver, when it is determined that the command signal is directed to the first receiver, and relaying the command signal, by the first receiver, to a second receiver for execution, when it is determined that the command signal is directed to the second receiver.

FIG. 1 shows an exemplary system 10. System 10 may include an input device 12, a first receiver 14, a second receiver 16, and a tether 18. Input device 12 may be any device which receives input from a user and transmits a corresponding command signal 12a in response. For example, input device 12 may be a remote control with an infrared (IR) light emitting diode or another suitable component that transmits a command signal 12a, such as electromagnetic radiation. However, it is to be appreciated that input device 12 may transmit command signals in any desired electromagnetic radiation band.

In one embodiment, first receiver 14 may be television receiver. However, first receiver 14 may be any device capable of providing media content to a user, such as, for example, an optical disk player and/or recorder (e.g., CD, DVD, MD), a VCR, an audio amplifier, a personal computer, or any other consumer electronics appliance that may receive commands by way of remote control.

Second receiver 16 may be a set top box (STB) or other receiver known in the art capable of receiving media content from a service provider network, and converting the content into a format suitable for presentation to a user. However, it is to be appreciated that second receiver 16 may alternatively be another consumer electronics appliance, such as one of the examples provided above in connection with first receiver 14. In one aspect, second receiver 16 may be operatively coupled to provide the media content to the user by way of first receiver 14.

Command signal 12a may include, among other things, a device code and a function code. The device code may identify the device the command is intended for (e.g., specific manufacturer, model number, etc.), while the function code may identify the function intended to be executed (e.g., "menu", "volume up", "channel down", "play", "picture-in-picture", etc.). For example, the user may press a television menu button on remote control 12. As such, command signal 12a may include a device code identifying the user's television 14, and a function code identifying a menu feature associated with television 14. Likewise, the user may press a "channel up" button on remote control 12. As such, command signal 12a may include a device code identifying television 14, and a function code identifying the "channel up" operation. It is to be appreciated that the codes and any communications referred to herein may be in accordance with any desired protocol known in the art (e.g., SONY control-S, Philips RC-5, etc.).

Figure 2:
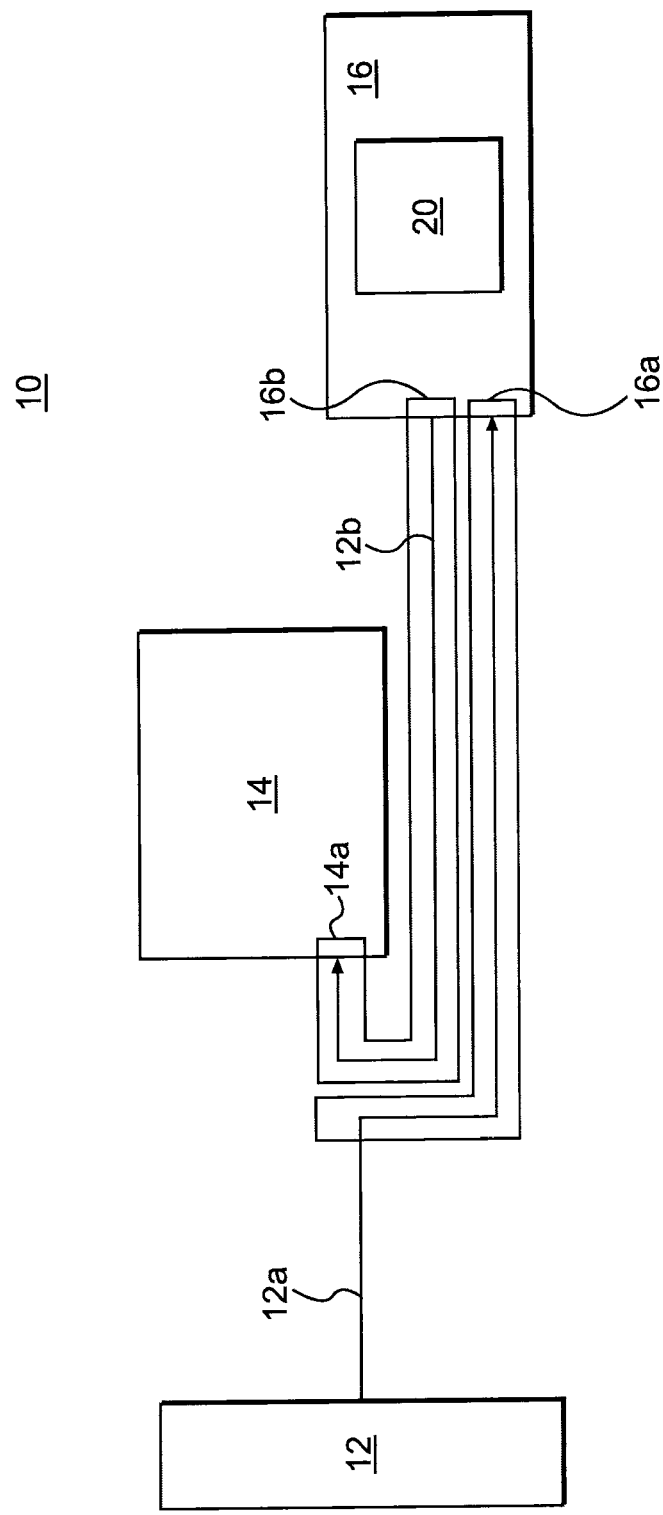
FIG. 2 is a diagrammatic representation of the exemplary disclosed system of FIG. 1.

Referring to FIG. 2, first receiver 14 may include a first sensor 14a to receive transmitted command signals. Similarly, second receiver 16 may include a second sensor 16a to receive transmitted command signals. In one embodiment, sensors 14a, 16a, may each embody an optical sensor (e.g., an infrared sensor), such as, for example, a photodetector, a photodiode, a phototransistor, or any other such device known in the art for detecting ambient energy capable of carrying a signal. Second receiver 16 may also include a transmitting device 16b, such as an infrared light emitting diode or other suitable transmitting device, to generate command signals in response to commands from a controller 20.

Controller 20 may comprise one or more processing devices that execute computer instructions in response to input from external sources and/or data stored on one or more storage devices (not shown). Controller 20 may include, for example, one or more microprocessors and memory storage. The microprocessor(s) may be any commercially available, off-the-shelf microprocessor(s), or application-specific integrated circuit(s) specifically adapted for system 10. The memory storage may include any desired combination of random access memory ("RAM"), read-only memory ("ROM"), and/or secondary storage devices (e.g., magnetic disks, optical disks, magnetic tape, and/or flash memory). Controller 20 may include an application in the form of software, hardware, and/or firmware configured to, among other things, affect operation of the disclosed method.

Controller 20 may be in communication with a database (not shown), which may be stored in the microprocessor(s) and/or memory storage of controller 20. Alternatively, the database may be stored in a remote location, if desired. In one embodiment, the database may contain a plurality of indexed entries, each including a device code, a function code, and one or more processing flags associated therewith, stored in a desired data structure. It is to be appreciated that the device code and/or function code contained in the entries may correspond to the device code and/or function code contained in command signal 12a, as discussed above. For example, the plurality of entries may comprise a catalog of universal remote control codes for a multitude of different manufacturers and devices. In one aspect, the catalog may be preloaded on the database. However, entries may be added to the catalog by, for example, downloading from the service provider's network and/or the Internet, uploading by an external device, and/or manually entered by the user.

Continuing with the example above where first receiver 14 is a television and second receiver 16 is a set top box, it is to be appreciated that some command signals 12a (e.g., "channel up", "play", "record", etc.) may be directed to, and should be executed by, set top box 16. Likewise, some commands may be directed to, and should be passed through to and executed by, television 14 (e.g., "volume", "picture-in-picture", "mute", etc.). Further, some commands (e.g., "power on/off", "up", "down", "enter", etc.) may be directed to either or both of television 14 and set top box 16, and should be passed through and/or executed by set top box 14, depending on the circumstances. As such, the process flag included with each entry may comprise one of a global pass-through flag, an unconditional pass-through flag, or a multi-function pass-through flag associated therewith, which may be returned by controller 20 upon searching and finding a desired entry in the database.

Receipt of a first global pass-through flag may indicate to controller 20 to enable a global pass-through state, in which subsequent commands may be passed through to first receiver 14 for execution, until a second global pass-through flag is received, which may disable the global pass-through state. For example, menu navigation commands may be applicable to menus associated with either receiver 14, 16. Continuing with the above example, the global pass-through state may be enabled when a television menu key is pressed on remote control 12. It is to be appreciated that once a television menu is activated, the user may wish to navigate through the menu and/or change one or more settings. As such, subsequent command signals (e.g., up, down, left, and "enter") may be passed through to television 14 for execution, rather than executed by set top box 16, until the television menu key is pressed again (or an "exit" key).

The unconditional pass-through flag may indicate to controller 20 that command signal 12a is only directed to first receiver 14, and should be passed through to first receiver 14 for execution under all circumstances. For instance, in one example, a "picture-in-picture" command signal may only be directed to television 14. That is, set top box 16 may have no function corresponding to such a command.

The multi-function pass-through flag may indicate to controller 20 that the command may either be passed through to first receiver 14, or executed by second receiver 16, depending on the circumstances. For example, the user may wish to temporarily pass command signal 12a through to first receiver 14, even if it is directed to second receiver 16, and/or both receivers 14, 16 (i.e., multi-function flag is returned). For example, a "power on/off" command may be directed to either receiver 14, 16. In one embodiment, the user may press a "power on/off" button of input device 12 twice in a short period of time (e.g., double-click), or affect some other input gesture on input device 12, to cause controller 20 to pass command signal 12a through to first receiver 14. Therefore, controller 20 may include an inter-key timer having a predetermined expiration period. Controller 20 may allow the user to input such a gesture within the expiration period, in order to manually pass command signal through to first receiver 14. However, if the timer expires before the user completes such an input gesture, second receiver 16 may process the signal instead. Alternatively or additionally, the user may press another key to cause the pass-through period to expire. These features will be further discussed below in connection with the disclosed method.

Figure 3:
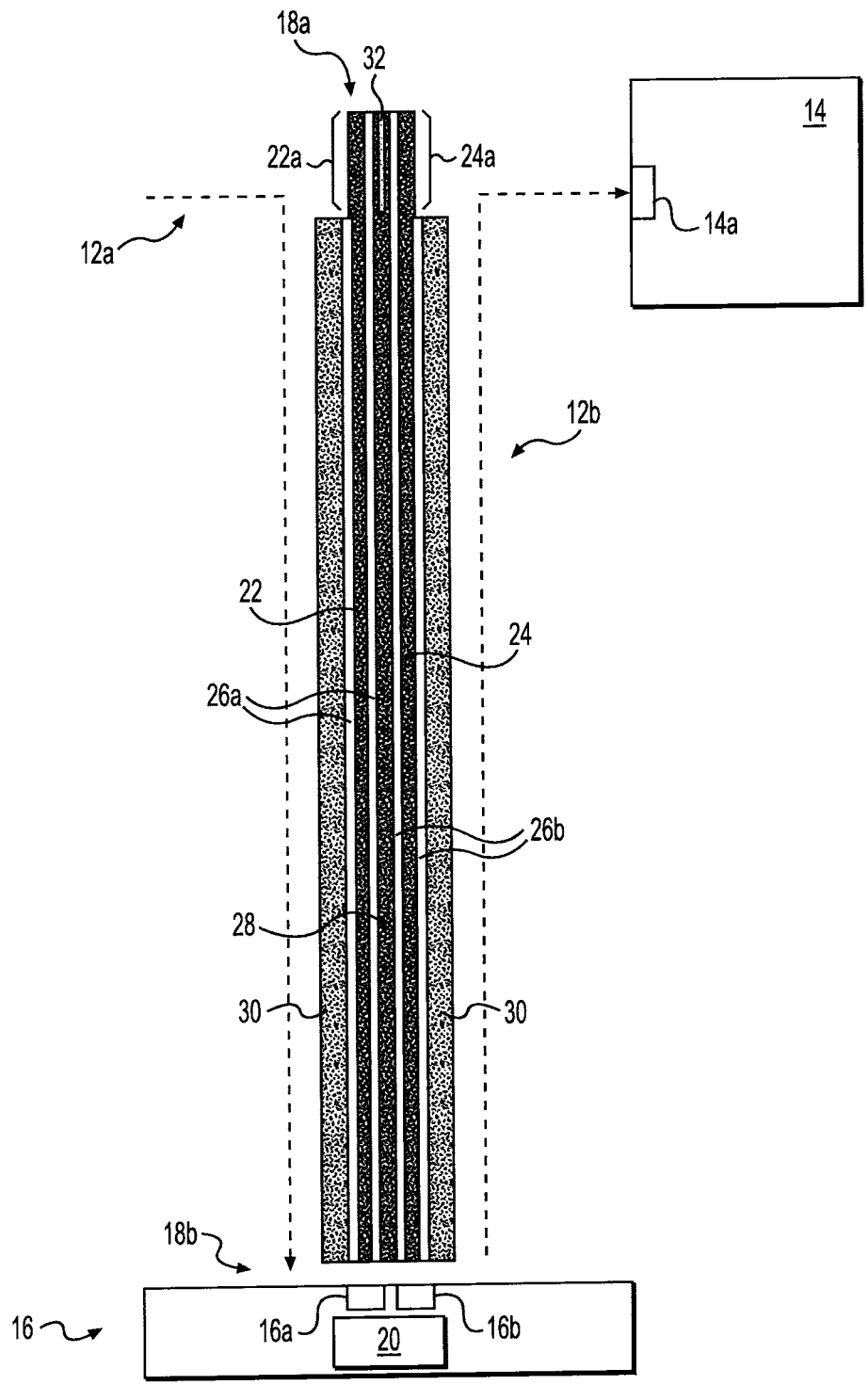
FIG. 3 is a cross-sectional representation of an exemplary disclosed tether for use with the system of FIG. 2.

FIG. 3 shows a cross-sectional view of tether 18, which may comprise, for example, a fiber optic cable. Tether 18 may have a first end 18a affixed to first receiver 14 and a second end 18b affixed to second receiver 16. In one embodiment, tether 18 may include an input waveguide 22 and an output waveguide 24 disposed parallel to one another with respect to longitudinal axes thereof. Input 22 and output 24 waveguides may each be optical fibers, comprising a glass, a plastic, a polymer, and/or any other suitable material known in the art for guiding electromagnetic radiation.

Tether 18 may further include a first reflective cladding 26a surrounding input waveguide 22, and a second reflective cladding 26b surrounding output waveguide 24. Input 22 and output 24 waveguides, and first 26a and second 26b claddings may comprise one or more of a glass, a plastic, a polymer, air, and/or any other suitable cladding material known in the art.

Tether 18 may further include an opaque insulator 28 disposed between input waveguide 22 and output waveguide 24, and an outer sheathing 30 surrounding input waveguide 22, output waveguide 24, first reflective cladding 26a, second reflective coating 26b, and insulator 28. Insulator 28 and sheathing 30 may comprise one or more of plastic, polymer, rubber, and/or any other suitable material known in the art.

Further, at least a portion 22a of input waveguide 22 and a portion 24a of output waveguide 24 may be exposed at first end 18a of tether 18. In one aspect, exposed portion 22a may protrude from first reflective cladding 26a and outer sheathing 30. Similarly, exposed portion 24a may protrude from second reflective cladding 26b and outer sheathing 30.

At first end 18a of tether 18, exposed portion 22a of input waveguide 22 may be in ambient communication with input device 12, while exposed portion 24a of output waveguide 24 may be communicatively coupled to sensor 14a. In one aspect, exposed portion 24a may be affixed to sensor 14a by an opaque adhesive 32 (e.g., tape). Adhesive 32 may at least partially cover exposed portion 24b and sensor 14a. Preferably, adhesive 32 may substantially and/or completely cover exposed portion 24a and sensor 14a and serve to communicatively couple exposed portion 24a to sensor 14a, but prevent ambient signals, such as command signals 12a, from being coupled into output waveguide 24 and/or sensor 14a. At second end 18b of tether 18, input waveguide 22 may be communicatively coupled to sensor 16a. Similarly, output waveguide 24 may be communicatively coupled to transmitting device 16b.

Although the disclosure is described with respect to tether 18 shown in FIG. 3, it is to be appreciated that other signal links may be used, if desired. For example, in another embodiment, first sensor 14a may be covered, disabled, and/or absent from first receiver 14. Command signal 12a may be detected by second sensor 16a. If the command signal should be executed by first receiver 14, controller 20 may relay the command signal directly to first receiver via an electrical wire or cable (not shown). Other coupling embodiments may become apparent to those skilled in the art upon practice of the disclosure.

Figure 4:
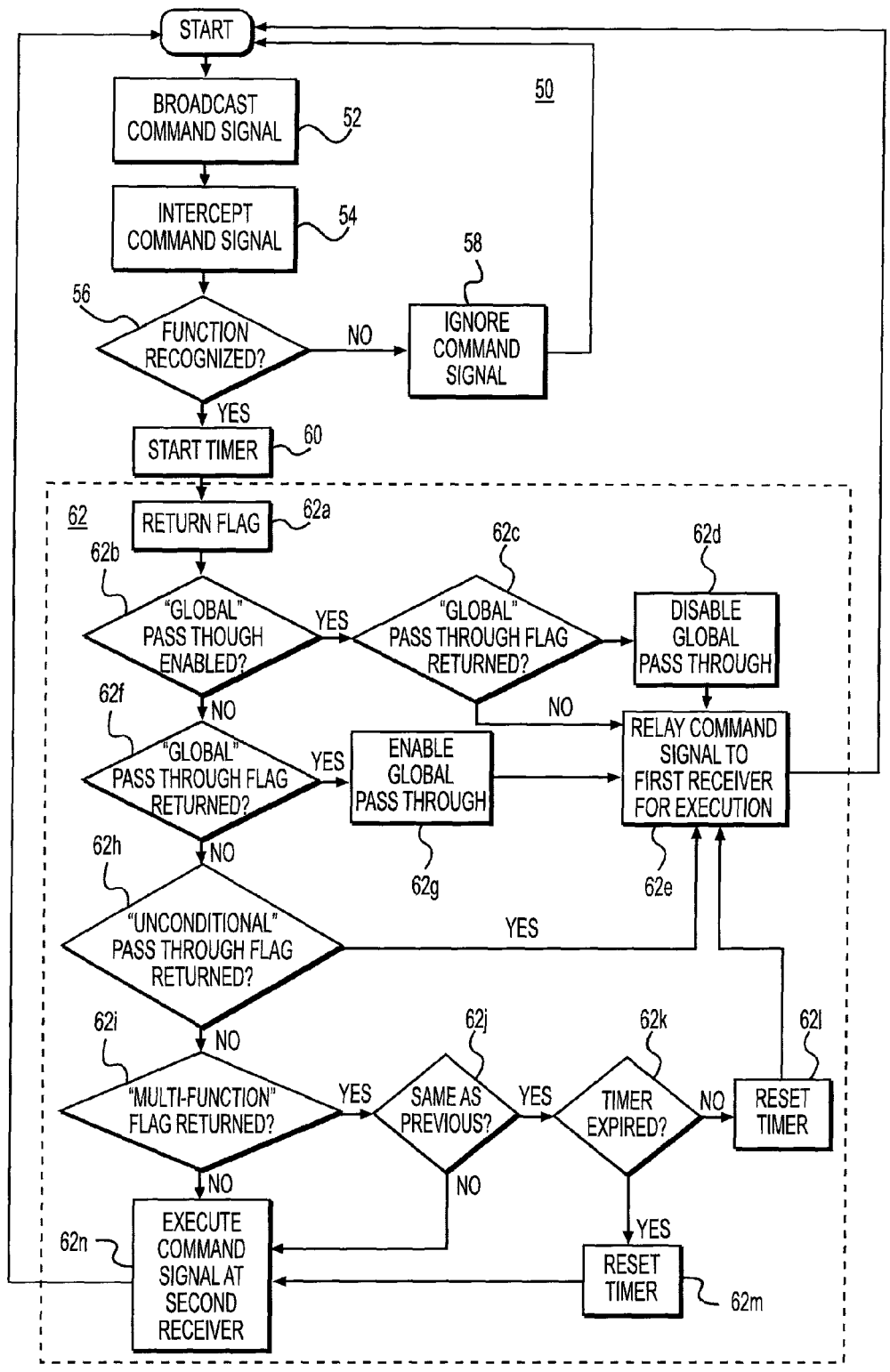
FIG. 4 is a flowchart depicting an exemplary disclosed method employed by the system of FIG. 2.

Referring now to FIG. 4, during operation 50 of system 10, input device 12 may transmit a command signal in response to user input (step 52). The command signal may then be received by input waveguide 22 (step 54). Specifically, the command signal may be ambiently coupled into exposed portion 22a of input waveguide 22. Simultaneously, command signal may be blocked by adhesive 32 and/or insulator 28, and prevented from being coupled into output waveguide 24 and/or detected by sensor 14a. Input waveguide 22 may then route the command signal to second end 18b of tether 18, at which point the command signal may be detected by sensor 16a. Sensor 16a may then provide the detected command signal to controller 20. In one aspect, command signal 12a may be converted from the optical domain to a corresponding signal in the electrical domain.

Subsequently, controller 20 may read the device code and/or function code contained in command signal 12a. Controller 20 may then search the entries in the database for the device code and/or function code. If the device code and/or function code is not found and/or is unrecognized (step 56), controller 20 may ignore the command signal 12a and cause first receiver 14 to display an error message (step 58) (e.g., "unrecognized device").

If the device code and/or function code is found, controller 20 may initiate an inter-key timer having predetermined expiration period (step 60). Controller 20 may then determine whether command signal 12a should be executed by the first receiver 14 and/or second receiver 16 (step 62). In this step, controller 20 may return any data associated with the entry, including any of the processing flags discussed above (step 62a). The data may be stored in the microprocessor(s) and/or memory devices of controller 20 for reference.

Subsequently, controller 20 may determine if the global pass-through feature is enabled (step 62b). If the global pass-through feature is enabled, controller 20 may next determine if a global pass-through flag was returned in step 62a (step 62c). If a global pass-through flag was returned in step 62a, controller 20 may toggle (disable) the global pass-through feature (step 62d), and relay command signal 12a to first receiver 14 for execution (step 62e). Similarly, if a global pass-through flag was not returned, controller 20 may relay command signal to first receiver 14 for execution (step 62e). Specifically, controller 20 may cause transmitting device 16b to retransmit command signal 12a. Retransmitted command signal 12b may be coupled into output waveguide 24 at second end 18b of tether 18. Output waveguide 14 may subsequently route retransmitted command signal 12b to first receiver 14 at first end 18a, where retransmitted command signal 12b may be coupled into, and detected by first sensor 14a, as discussed above.

If the global pass-through feature was determined to be disabled upon completion of step 62b, controller 20 may determine if a global pass-through flag was returned in step 62a (step 62f). If a global pass-through flag was returned, controller 20 may toggle (enable) the global pass-through feature (step 62g). Subsequently, controller 20 may relay command signal 12a to first receiver 14 as discussed above in connection with step 62e.

If a global pass-through flag was not returned, controller 20 may determine if an unconditional pass-through flag was returned in step 62a (step 62h). If an unconditional pass-through flag was returned, controller 20 may relay command signal 12a to first receiver 14 for execution, as in step 62e. If an unconditional pass-through flag was not returned, controller 20 may determine if a multi-function pass-through flag was returned in step 62a (step 62i). If a multi-function pass-through flag was returned, controller 20 may determine if the device code and/or function code contained in the entry are the same as the device code and/or function code of a previous command (step 62j). If the device code and/or function code are determined in step 62j to be the same as the device code and/or function code of the previous command, controller 20 may determine if the inter-key timer period has expired (step 62k). If the inter-key timer period has not expired, controller 20 may reset the inter-key timer (step 62l) and relay command signal 12a to first receiver 14 for execution (step 62e).

If the inter-key timer period has expired, controller 20 may reset the timer (step 62m) and cause second receiver 16 to execute command signal 12a (step 62n). If controller 20 determines in step 62j that the device code and/or function code contained in the entry are not the same as the device code and/or function code of the previous entry, controller 20 may likewise cause second receiver 16 to execute the command signal (step 62n). If controller 20 determines in step 62i that the multi-function pass-through flag was not returned in step 62a, controller 20 may also cause second receiver 16 to execute command signal 12b (step 62n).

By employing the methods and systems disclosed above, the user may rely on the original remote control, rather than the universal remote supplied by the service provider, to control functions of both the set top box and his or her original equipment. As such, the user may be able to take advantage of all the features available on his or her equipment, rather than forego use of specific features that may not be included on the universal remote control.

Additionally, the disclosed methods and systems may reduce the need for expensive components (e.g., sensors, displays, buttons, LED's, etc.) to be included on the set top box. As such, the physical footprint of the design may be substantially reduced. In addition to reducing manufacturing costs, this may allow the set top box to be stored out of sight and/or in a remote location (e.g., mounted to the back of the television, stored in a closet or another room, etc.). Accordingly, equipment clutter in the user's home may be reduced.

It is intended that the specification and examples described herein be considered as exemplary only, with a true scope and spirit of the invention being indicated by the following claims.

I claim:

1. A tether for coupling a first receiver and a second receiver, the tether comprising:
   an input waveguide and an output waveguide having longitudinal axes disposed parallel to one another;
   a first reflective cladding surrounding the input waveguide;
   a second reflective cladding surrounding the output waveguide;
   an opaque insulator disposed between the input waveguide and the output waveguide;
   a sheathing surrounding the input waveguide, the output waveguide, the first reflective coating, the second reflective coating, and the opaque insulator; and
   wherein at least a portion of the input waveguide and a portion of the output waveguide are exposed at a first end of the tether, and the exposed portion of the input waveguide is in communication with an input device configured to transmit a command signal in response to user input.

2. The tether of claim 1, wherein the first end of the tether is affixed to the first receiver, and a second end of the tether is affixed to the second receiver.

3. The tether of claim 2, further including an opaque adhesive disposed over the exposed portion of the output waveguide to couple the exposed portion of the output waveguide to a first sensor associated with the first receiver, wherein the opaque adhesive at least partially covers the exposed portion of the output waveguide and the sensor.

4. The tether of claim 2, wherein, at the second end of the tether, the input waveguide is in communication with a second sensor associated with the second receiver, and the output waveguide is in communication with a transmitting device associated with the second receiver.

5. The tether of claim 1, wherein the input waveguide and output waveguide are optical fibers.

6. The tether of claim 1, wherein the input waveguide and output waveguides comprise one or more of a glass, a plastic, and a polymer.

* * * * *